Dec. 16, 1969  O. W. OHLSSON  3,484,848
TEMPERATURE RESPONSIVE TRANSDUCER
Filed Oct. 15, 1968
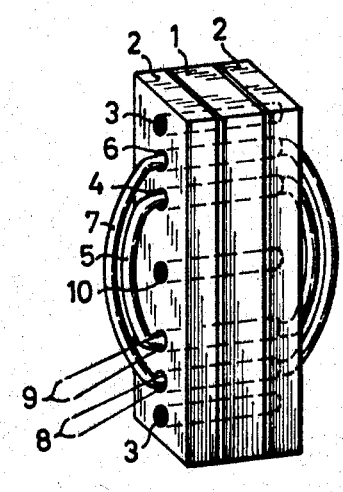
INVENTOR
OLOF WERNER OHLSSON
By Cushman, Darby & Cushman
ATTORNEYS

United States Patent Office 3,484,848
Patented Dec. 16, 1969

3,484,848
TEMPERATURE RESPONSIVE TRANSDUCER
Olof W. Ohlsson, Jonkoping, Sweden, assignor to Industrilaboratoriet Aktiebolag, Jonkoping, Sweden, a joint-stock company of Sweden
Filed Oct. 15, 1968, Ser. No. 767,695
Int. Cl. G01k 5/18, 5/52, 5/72
U.S. Cl. 73—362
6 Claims

ABSTRACT OF THE DISCLOSURE

A temperature responsive transducer which utilizes the magnetostrictive effect having a measuring body of a ferromagnetic material and a load body of a material having a thermal expansion coefficient differing from that of the measuring body. The load body is rigidly connected to the measuring body in at least two points which are so located that the difference in thermal expansion coefficients of the respective bodies gives rise to a change in the load upon the measuring body at a change in temperature. The transducer is provided with at least one energizing winding and at least one measuring winding, each of which surrounds a respective portion of the measuring body. The measuring body and the load body are dimensioned and rigidly interconnected in such a manner that the load change which arises in response to the change in temperature produces an output voltage in the measuring winding on account of the magnetostrictive effect. The output voltage indicates the temperature change.

---

This invention relates to a transducer, which utilizes the magnetostrictive effect and comprises a measuring body of a ferromagnetic material as well as at least one energizing winding, which surrounds a portion of the measuring body, and at least one measuring winding, and a load body, which consists of a material having a thermal expansion coefficient differing from that of the measuring body and is rigidly connected to the measuring body in at least two points which are so located that the difference in thermal expansion coefficients of the respective bodies gives rise to a change in the load upon the measuring body at a change in temperature.

In a temperature responsive transducer of the prior art one of said bodies has the shape of a cylindrical sleeve, and the other body is a rod which is inserted in said sleeve and is connected to the two ends and the central portion of the sleeve. On each side of its central portion the sleeve is also provided with a ring of substantially helical slots in such a manner that the mechanical traction or pressure load on the sleeve in response to a change in temperature gives rise to a limited rotational movement of the central portion of the sleeve with respect to the end portions thereof. In its turn this rotational movement gives rise to a change in the output voltage induced over the measuring winding. This rather complex structure which at small movements, among other things due to the change in the physical shape of the sleeve caused by a change in temperature, suffers from mechanical hysteresis and consequent non-linearity in the range within which hysteresis occurs.

The primary object of the invention is to eliminate such drawbacks of a temperature responsive transducer.

This object is attained by the transducer according to the present invention which is characterized in that the measuring body and the load body are dimensioned and rigidly interconnected in such a manner that the connections between the bodies substantially prevent any relative motion between as well as any deformation of the respective bodies, the load change which arises in response to the change in temperature giving rise to an output voltage, which indicates said temperature change, over the measuring winding on account of the magnetostrictive effect.

The invention will now be more particularly described below with reference to the annexed drawing which is a perspective view of a transducer according to the invention.

In the drawing 1 designates a parallelepipedal measuring body of magnetostrictive material and 2, two likewise parallelepipedal partial bodies of a material having a thermal expansion coefficient differing from that of the first mentioned material. The partial bodies 2 are secured to the measuring body 1 parallel to the measuring body and on opposite sides thereof by means of two rivets 3 which are located near the end of the bodies and pass through all of said bodies. A measuring winding 5 is threaded through two bores 4 which are located comparatively centrally and are parallel to each other and pass through all of said bodies, and an energizing winding 7 is threaded through two bores 6 which are located outside the bores 4 substantially in the plane defined by the bores 4. The bores 6 are substantially parallel to each other and to the bores 4.

If the terminals 8 of the energizing winding 7 are connected to an alternating current source (not shown), there is induced, in a manner known per se, between the terminals 9 of the measuring winding an alternating voltage which can be measured by suitable measuring means. At an alteration in temperature the measuring body tends to change its length, and on account of the difference in thermal expansion coefficients of the bodies 1, 2 this change in length differs from that which the partial bodies 2 serving as a load body simultaneously tend to undergo. The rivets 3 by which the bodies 1, 2 are united at their ends positively prevent the alteration in length of the different bodies to become different. Instead hereof, the bodies will become subjected to a traction load and a pressure load respectively in their longitudinal direction. The mechanical load to which the magnetostrictive measuring body 1 is subjected deforms the magnetic field created in the measuring body by the energizing winding 7. On account of this deformation the magnitude of the magnetic field through the measuring winding 5 is altered, and as a consequence hereof the voltage induced in the measuring winding is changed. The magnitude of the alteration of the voltage consequently constitutes a measure of the magnitude of the alteration in temperature.

On account of the fact that the change in length of the bodies is proportional to the change in temperature, the change in load which is responsive to temperature is proportional to the change in temperature.

Of course, the invention is not restricted to the embodiment of a temperature responsive transducer described above and illustrated in the drawing but can be modified in several respects. Thus, the measuring bodies as well as the load bodies may be divided into two or more partial bodies which are parallel to each other and are united with each other, one or several partial bodies of the one kind alternating with a body or a partial body of the other kind. The energizing winding and/or the measuring winding may be so arranged that it embraces only part of the magnetostrictive measuring body. The windings may be arranged in another mutual relationship than in one and the same plane which is parallel to the longitudinal direction of the bodies. The measuring winding may accordingly in another embodiment be arranged outside the energizing winding. The two windings may be located beside each other or have other positions in relation to each other. The load body may be of non-magnetical material, such as copper, but may, of course, also be made of a magnetic material. The essential feature resides therein that the load body is made of a material having a thermal expansion coefficient differing from that of the material of the measuring body. In the embodiment illustrated in the drawing the measuring body and the load bodies 2 are secured to each other by means of the rivets 3. These rivets may be replaced by bolt joints or by welded, soldered or adhesive bonds. The bodies of the two different kinds secured to each other should be given such dimensions and should alternate with each other in such a fashion that possible tendencies of warping or bending of the bodies are counteracted, since such tendencies could entail unexpected variations in the mechanical load upon the measuring body and on account hereof also in the voltage induced in the measuring winding 5. Such a bending of the measuring and load bodies could be counter-checked by a rivet 10 or a similar joint located in the central portions of the bodies and extending parallel to the rivets 3.

A useful temperature responsive transducer is also obtained even if the different bodies are secured to each other along their entire length and width. In this case a change in temperature causes, however, in addition to the wanted mechanical load in the longitudinal direction of the bodies also a load upon the bodies in their transverse direction. Such transverse load counteracts to a certain extent the effect obtained by the load in the longitudinal direction of the bodies, which makes such a structure less sensitive.

What is claimed is:

1. A transducer which utilizes the magnetostrictive effect comprising a measuring body of a ferromagnetic material, at least one energizing winding, which surrounds a portion of the measuring body, at least one measuring winding, a load body, which consists of a material having a thermal expansion coefficient differing from that of the measuring body and which is rigidly connected to the measuring body in at least two points which are so located that the difference in the thermal expansion coefficients of the respective bodies produces a change in the load upon the measuring body at a change in temperature, characterized in that the measuring body (1) and the load body (2) are dimensioned and rigidly interconnected in such a manner that the connections (3) between the bodies substantially prevent any relative motion between as well as any deformation of the respective bodies, the load change which arises in response to the change in temperature producing an output voltage, which indicates said temperature change, over the measuring winding because of the magnetostrictive effect.

2. A transducer according to claim 1, characterized in that the measuring body (1) and the load body (2) have substantially plane surfaces facing each other.

3. A transducer according to claim 1, characterized in that at least one of said two bodies (1, 2) is divided into a plurality of mutually parallel partial bodies.

4. A transducer as set forth in claim 3 in which at least one body of one kind is interlaced between two partial bodies of the other kind.

5. Transducer according to claim 1, characterized in that the energizing winding (7) and the measuring winding (5) embrace portions of the measuring body (1) as well as the load body (2).

6. A transducer according to claim 1, characterized in that said connecting points are in a common plane and said energizing winding (7) and said measuring winding (5) also are located in said common plane.

References Cited

UNITED STATES PATENTS 3,000,214 9/1961 Dubsky et al. _____ 73—362
3,403,558 10/1968 Elliott.

LOUIS R. PRINCE, Primary Examiner

FREDERICK SHOON, Assistant Examiner

U.S. Cl. X.R.

73—88.5